United States Patent
Hajtmacher (10) Patent No.: US 11,344,020 B1
(45) Date of Patent: May 31, 2022

(54) SYSTEM OF HOME IMPROVEMENT DEVICES IN COMMUNICATION OVER A LOW POWER WIDE AREA NETWORK

(71) Applicant: Royal Guemar Group, LLC, Sunny Isles, FL (US)

(72) Inventor: Martin Hajtmacher, Sunny Isles, FL (US)

(*) Notice: Subject to any disclaimer, the term of this patent is extended or adjusted under 35 U.S.C. 154(b) by 0 days.

(21) Appl. No.: 17/245,746

(22) Filed: Apr. 30, 2021

Related U.S. Application Data (60) Provisional application No. 63/022,050, filed on May 8, 2020.

(51) Int. Cl.
| | | |
|---|---|---|
| *A01M 1/02* | (2006.01) | |
| *G08B 3/10* | (2006.01) | |
| *A01M 1/10* | (2006.01) | |
| *H04W 84/18* | (2009.01) | |
| *H04W 88/16* | (2009.01) | |

(52) U.S. Cl.
CPC .......... *A01M 1/026* (2013.01); *A01M 1/103* (2013.01); *G08B 3/10* (2013.01); *A01M 2200/011* (2013.01); *H04W 84/18* (2013.01); *H04W 88/16* (2013.01)

(58) Field of Classification Search
CPC ........ A01M 1/026; A01M 1/103; A01M 1/00; A01M 1/02; A01M 2200/011; H04W 84/16
See application file for complete search history.

(56) References Cited

U.S. PATENT DOCUMENTS 5,564,222 A * 10/1996 Brody .................. A01M 1/2011
43/124
5,575,105 A * 11/1996 Otomo .................. G01N 29/11
43/132.1

(Continued)

FOREIGN PATENT DOCUMENTS

| GB | 2524307 A | * | 9/2015 | ............ A01M 1/026 |
| WO | WO-0126456 A1 | * | 4/2001 | ............ A01M 1/026 |

OTHER PUBLICATIONS https://www.youtube.com/watch?v=GLqpHX6p64M (Arduino Multimeter and components sensor tester) (Year: 2017).*

(Continued)

*Primary Examiner* — Peter M Poon
*Assistant Examiner* — Shada Mohamed Alghailani
(74) *Attorney, Agent, or Firm* — Sanchelima & Associates, P.A.; Christian Sanchhelima; Jesus Sanchelima (57) ABSTRACT

A sensor system for detecting objects includes a plurality of devices and a network assembly. The plurality of device assemblies includes an object detector assembly, a termite trap assembly, and a pest trap assembly. The object detector assembly includes a device implemented along the outer perimeter of a house in order to detect various objects. Additionally, the termite trap assembly includes a cardboard cutout with a high cellulose content having conductive ink. Furthermore, the pest trap assembly includes a housing having a trap door that is used to capture pests such as rodents and mice. Each of the devices are in communication with the network assembly via a low power wide area network. Each of the devices may also act as a repeater thereby further extending the range of communication for each of the devices.

1 Claim, 9 Drawing Sheets

(56) References Cited

U.S. PATENT DOCUMENTS

| | | | | |
|---|---|---|---|---|
| 5,592,774 A * | 1/1997 | Galyon | A01M 1/026 |
| | | | 43/124 |
| 5,815,090 A * | 9/1998 | Su | A01M 1/2011 |
| | | | 43/132.1 |
| 6,166,641 A * | 12/2000 | Oguchi | A01M 1/026 |
| | | | 340/573.1 |
| 6,178,834 B1 * | 1/2001 | Cates | A01M 1/026 |
| | | | 43/132.1 |
| 6,281,799 B1 * | 8/2001 | Lake | A01M 1/026 |
| | | | 340/573.1 |
| 6,304,185 B1 * | 10/2001 | Tuttle | A01M 1/026 |
| | | | 340/10.1 |
| 6,370,812 B1 * | 4/2002 | Burns | A01M 1/026 |
| | | | 43/124 |
| 7,084,640 B2 * | 8/2006 | Berhorst | A01M 1/026 |
| | | | 324/611 |
| 7,212,112 B2 * | 5/2007 | Barber | A01M 1/026 |
| | | | 340/539.2 |
| 10,617,110 B2 * | 4/2020 | Cink | A01M 1/2011 |
| 2001/0009399 A1 * | 7/2001 | Barber | A01M 1/2011 |
| | | | 340/573.2 |
| 2002/0101352 A1 * | 8/2002 | Barber | A01M 1/24 |
| | | | 340/573.2 |
| 2003/0160699 A1 * | 8/2003 | Trompen | A01M 1/026 |
| | | | 340/573.2 |
| 2006/0017577 A1 * | 1/2006 | Broussard | A01M 1/24 |
| | | | 340/573.2 |
| 2016/0219858 A1 * | 8/2016 | Cink | A01M 1/026 |
| 2016/0374326 A1 * | 12/2016 | Azzarello | A01M 1/026 |
| | | | 43/131 |
| 2018/0206472 A1 * | 7/2018 | Maxik | A01M 1/106 |
| 2018/0322436 A1 * | 11/2018 | Sotiroudas | A01M 1/026 |
| 2019/0008131 A1 * | 1/2019 | Austin | A01M 1/026 |
| 2019/0013960 A1 | 1/2019 | Sadwick | |
| 2019/0104715 A1 * | 4/2019 | Ben Hamozeg | G08C 17/02 |
| 2019/0109904 A1 | 4/2019 | Binder et al. | |

OTHER PUBLICATIONS https://lora-alliance.org/wp-content/uploads/2020/11/what-is-lorawan.pdf PDF provided, 2015 (Year: 2015).*

Wireless Mesh Networking: An IoT-Oriented Perspective Survey on Relevant Technologies, p. 20+ (Year: 2019).*

* cited by examiner

SYSTEM OF HOME IMPROVEMENT DEVICES IN COMMUNICATION OVER A LOW POWER WIDE AREA NETWORK

OTHER RELATED APPLICATIONS

The present application is a U.S. Non-Provisional Patent Application claiming priority of U.S. Provisional Patent Application Ser. No. 63/022,050 filed on 8 May 2020, which is hereby incorporated by reference.

BACKGROUND OF THE INVENTION

1. Field of the Invention

The present invention relates to a system of home improvement devices in communication over a low power wide area network and, more particularly, to a system of home improvement devices which may be installed in an indoor and outdoor environment which communicates with a server using a low power wide area network.

2. Description of the Related Art

Several designs for a system of home improvement devices have been designed in the past. None of them, however, include a sensor system including an object detector assembly, a network assembly, a termite trap assembly, and a pest trap assembly. The object detector assembly includes a cylindrical housing which houses at least one sensor. They may also include, a USB port, an optional solar panel attachment, and wireless communication hardware. Sensors are housed within the device assembly and may include at least one sensor to detect objects. Additionally, the termite trap assembly includes a cardboard cutout with a high cellulose content having conductive ink. Furthermore, the pest trap assembly includes a housing having a trap door that is used to capture pests such as rodents and mice. Each of the devices are in communication with the network assembly via a low power wide area network. Each of the devices may also act as a repeater thereby further extending the range of communication for each of the devices. It is known that there is an increasing use of implementing technologies into households to create smart homes. Therefore, there is a need for a sensor system to detect various objects within a home to improve the quality of life and technology within a home.

Applicant believes that a related reference corresponds to U.S. patent publication No. 2019/0109904 issued for a system and method in a building or vehicle for an actuator operation in response to a sensor according to a control logic. The system comprises a router or gateway which communicates with a device associated with the sensor and a device associated with the actuator. Applicant believes that another related reference corresponds to U.S. patent publication No. 2019/0013960 issued for a wireless control system which includes multiple wireless transmitters and a control circuit configured to transmit information form the wireless transmitters. However, the cited references differ from the present invention because the fail to provide a sensor system with a plurality of devices that are all in communication with a low power wide area network. Additionally, each of the devices may serve as repeaters to advantageously extend the range of the network.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a sensor system which detects objects in a predetermined space within a horizontal and vertical axis of an outdoor or indoor environment.

It is another object of this invention to provide a sensor system which communicates with a server through a low power wide area network protocol and further sends notifications to a mobile device. Additionally, the sensor system includes a device assembly which functions as a repeater for other devices of the same family to create a large or infinite communication coverage area.

It is still another object of the present invention to provide a sensor system which may be used to detect temperature differences, termite presence, clogging of drain pipes, leaks of water in the network, and rodent presence and notify a user of these issues in a timely manner.

It is still another object of the present invention to provide a sensor system which has an extremely long autonomy due to the programmed action cycles and alter triggers implemented using a solar charging system.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed a sensor system 10 which basically includes an object detector assembly 20 and a network assembly 40, a termite trap assembly 60, and a pest trap assembly 80.

Figure 2:
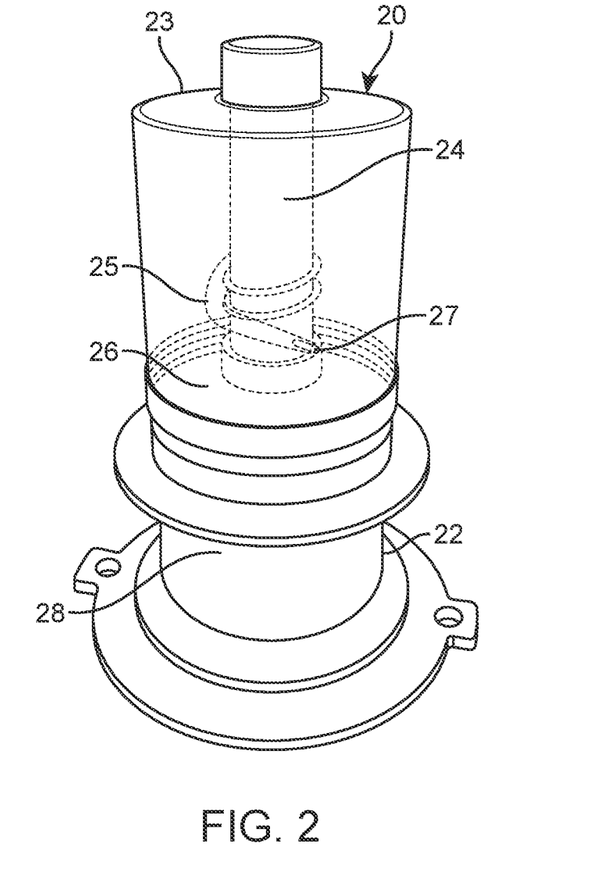
FIG. 2 shows an isometric view of device assembly 20 in accordance to an embodiment of the present invention.

Object detector assembly 20 includes a housing 22 that is covered by a casing 23. In one embodiment, housing 22 has a substantially cylindrical shape with casing 23 being a clear casing. Additionally, casing 23 may be of a waterproof, snow proof, solar radiation proof, and durable material to withstand harsh weather conditions of an outdoor environment. Additionally, the top end of casing 23 may also include a solar panel that is used to provide charge to an internal battery.

Housing 23 houses a variety of components including a stepper motor 24 that is capable of performing a circular sweep. Stepper motor 24 provides the necessary function to enable sensors within housing 22 to properly analyze a predetermined area. In one embodiment, at least one sensor 25 is mounted onto stepper motor 24. Sensors 25 may come in various forms such as but not limited to a laser sensor, an optical sensor, and an ultrasound sensor. In one implementation, a distance sensor is mounted to stepper motor 24 to perform a circular sweep within a certain period of time to detect an obstacle or object within a predetermined area. This implementation may be observed in FIG. 3 of the provided drawings.

Figure 3:
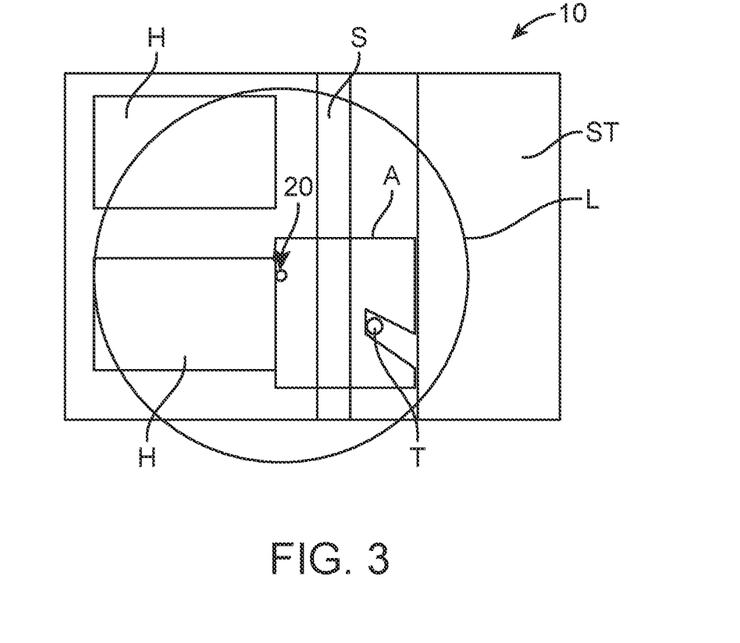
FIG. 3 illustrates a top view of a housing environment depicting an implementation of sensor system 10 in accordance to an embodiment of the present invention.

In the implementation observed in FIG. 3, it can be seen that object detector assembly 20 is placed in an outdoor environment next to a home H next to a sidewalk S. It can be seen a measurement limit L that represents the greatest distance to which object detector assembly 20 may measure. This limit L may be configured by a user and modified depending on which type are sensors are used to accomplish this measurement. A user may then set a measurement area A which represents the area which object detector assembly 20 will sweep in order to identify objects within that space. The area A can be configured through a user by means of network assembly 40. A user can then communicate with object detector assembly 20 to determine measurement points that set where the object detector will measure and the maximum distance to be measured before moving on to the next point. A laser beam sensor may be used in this implementation in order for a user to visualize the measurement point. A measurement point may be represented with one degree of rotation from the stepper motor. As a result, a user may have 360 measurement points for one whole rotation of the stepper motor. This implementation aids users in detecting objects outside home H such as tree T seen in FIG. 3. A user may then set a timer for how often a sweep will be conducted in this environment. The object detector assembly will then sweep the area A at the predetermined time and send an alert through network assembly 40 if an object is detected.

Object detector assembly 20 may further include a buzzer 26 inserted within housing 22. In one embodiment, buzzer 26 provides an audible alert in the event that an object is detected within area A. Furthermore, buzzer 26 may be configured to provide notification alerts to a user relating to maintenance of object detector assembly 20 such as battery replacement and/or a recharger. Additionally, all components within housing 22 may be powered by a battery 28 provided within housing 22. In one embodiment, battery 28 may be provided as a rechargeable battery that is rechargeable through a USB port that is located on housing 22. In another embodiment, housing 22 may be provided with a solar panel that chargers battery 28 when it is exposed to light. Implementing the solar panel will eliminate the need to continually replace or charge battery 28. Additionally, object detector assembly may include a mini controller that is programmed to ensure that the object detector assembly utilizes low consumption of electricity in order to preserve the battery for a long period of time. In this embodiment, the battery is programmed to be in standby mode and will turn on after a predetermined amount of time unless an alert is detected. This predetermined amount of time may be defined as 1 hour, 3 hours, 10 hours, or any other amount of time. In the event that an alert is detected, the device will turn on and transmit the gathered data via a communication module 27. When there are not alerts, the device will remain on standby for a predetermined amount of time and will turn on briefly in order to perform a status check and then return to standby mode to preserve batter consumption. The standby periods for the battery may be automated by a server of the network assembly that is in communication with the object detector assembly.

Object detector assembly 20 further includes a communication module 27 which allows the device to communicate with network assembly 40 and transfer/receive information. This module also allows information to be repeated from any other device in the same family, this includes termite trap assembly 60 and pest trap assembly 80. In a preferred embodiment of the present invention, communication module 27 utilizes a low power wide area network. In one embodiment, the low power wide area network may be a LORAWAN™ transmission module. This allows object detector assembly 20 to communicate with network assembly 40 through a gate way protocol which may be a LORAWAN™ in one embodiment. LORAWAN™ provides the optimal communication protocol to transfer data for the present invention. The device may also be configured to work as a LORAWAN™ repeater to be able to interconnect with other devices to form a network within themselves. This will aid in transmitting information in the event that a gateway is out of reach from a device. Additionally, communication module 27 may utilize only transceiver slave nodes with a server to avoid information theft. Communication module 27 may further be configured to transmit and receive information over a WIFI connection or a Bluetooth connection. This aids a user in pairing a mobile device with object detector assembly 20. Object detector assembly 20 may further be configured to communicate with third party systems such as ALEXA™ and/or Google™. Additionally, the communication module 27 allows for the system to be updated remotely from the server to be able to communicate with other third-party communication platforms.

Figure 1:
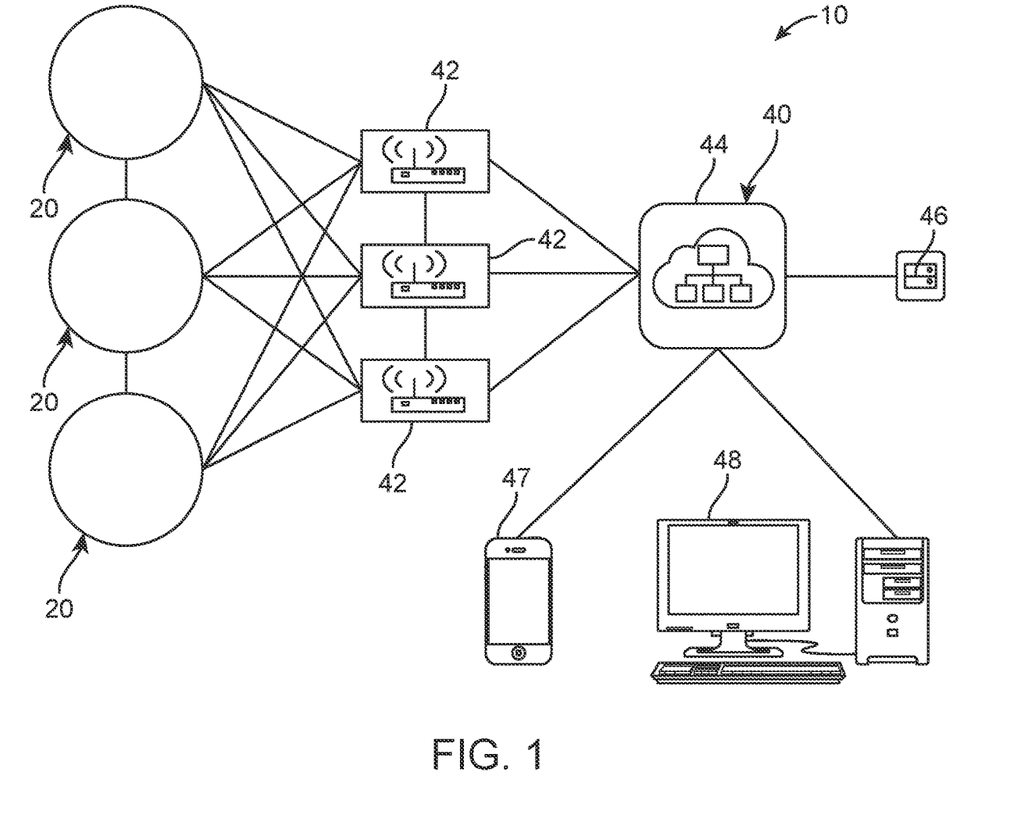
FIG. 1 represents an operational diagram of sensor system 10 depicting device assembly 20 and network assembly 40 in accordance to an embodiment of the present invention.

Network assembly 40 includes at least one gateway 42 placed in a communicative distance from device assembly 20. In one embodiment, gateway 42 may be provided as a LORAWAN™ gateway. Through this protocol, device assembly 20 may transmit as well as receive information. Gateway 42 communicates with device assembly 20 and transmits information through a network 44. Any number of gateways 42 may be used for network system 10. Device assembly 20 has the ability to work as a repeater in the event that a gateway is out of reach. In one embodiment, network 44 may be provided over a 3G, 4G, WIFI, or ethernet connection, or any other radio communication network. Network 44 is then connected to a mobile device 47 and a PC 48. In one embodiment mobile device 47 and PC 48 are configured to send and receive information from device assembly 20. A user may set parameters such as distance parameters from these devices and modify device assembly 20 remotely. Additionally, these devices may receive notifications from device assembly 20 to warn them of objects located in a particular area. A server 46 will manage information and logic from device assembly 20 in order to provide increased security to the system and prevent information theft. Additionally, the information broadcasted to server 46 may be viewed from a web site or application installed on electronic devices. The software of device assembly 20 may receive updates through server 46 in order to improve the functionality of device assembly 20. The more devices that are implemented in sensor system 10 the more information will be available to analyze behaviors and objects in the predetermined area.

Figure 4:
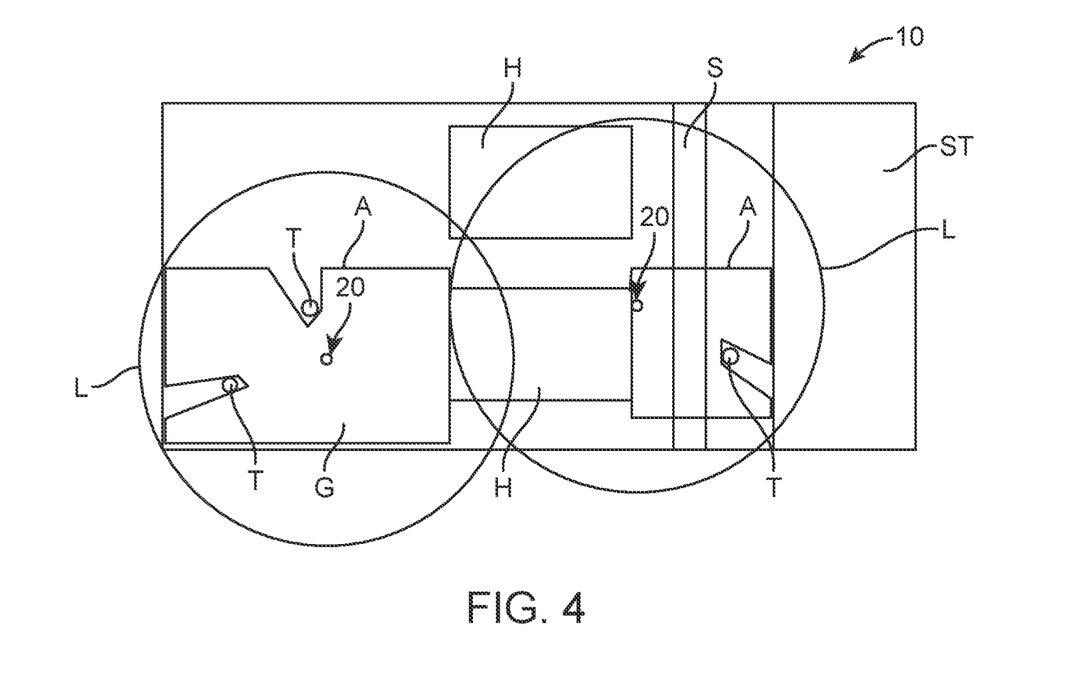
FIG. 4 is a representation of a top view of a housing environment depicting an implementation of sensor system 10 in accordance to another embodiment of the present invention.

In another implementation of the present invention, sensor system 10 may be used as a smart grass height detector. This implementation can be in figured 4 of the provided drawings. Device assembly 20 is then configured to detect the detect the height of grass G when it exceeds a certain height in a measured area A. In this implementation, device assembly 20 is configured to move a sensor 25 in a vertical configuration. This is achieved by adding an additional step motor 24 within housing 22. The additional step motor will move sensor 25 in a vertical configuration in order to sense the height of grass G in a field near home H. In one embodiment, the height setting may be manually set. Additionally, device assembly 20 may be set to automatically scan a predetermined area within various time intervals. A notification may be broadcasted through network assembly 40 once the height of grass G exceeds a predetermined amount. Furthermore, in this implementation, sensor system 10 includes an ultrasound generation system with an amplifier configured to varied frequency sounds to scare away insects and rodents. As a result, a user's grass G is kept free of these pests. The varying frequency generated by this module prevents insects and rodents from becoming accustomed to a specific sound frequency. By actively varying the frequency, the insects and rodents will always be driven away.

Figure 6:
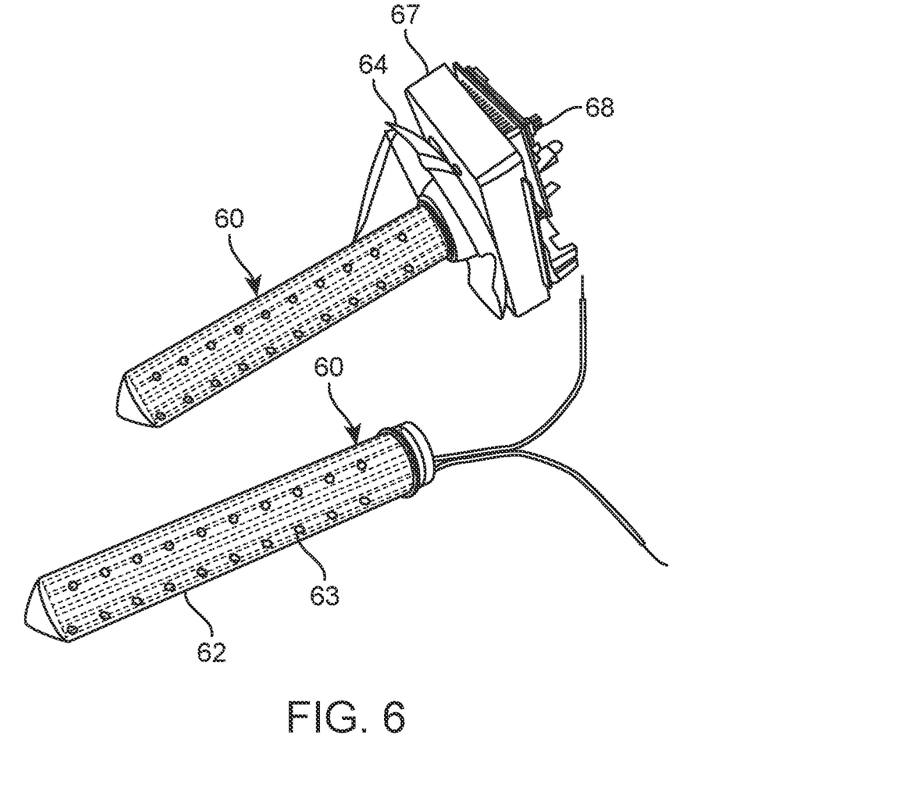
FIG. 6 illustrates an isomeric view of termite trap assembly 60 depicting cardboard sheet 65 inserted within housing 62 in accordance with an embodiment of the present invention.
Figure 7:
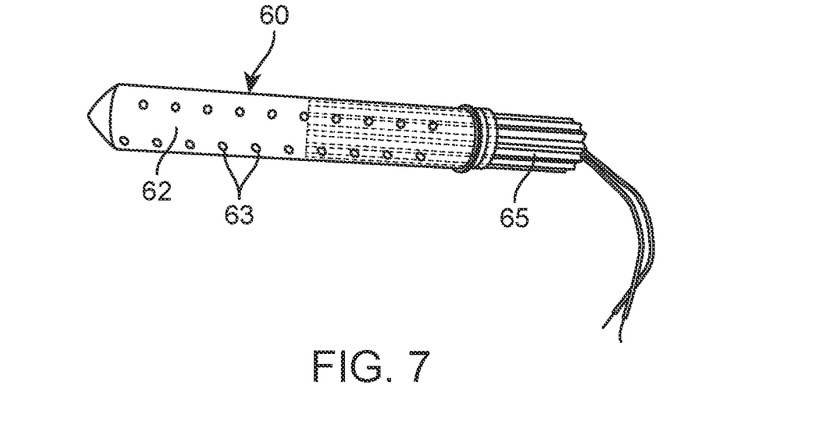
FIG. 7 represents an isometric view of termite trap assembly 60 depicting cardboard sheet 65 partially inserted within housing 62 in accordance with an embodiment of the present invention.

Termite trap assembly 60 includes a housing 62 which may be provided in any suitable shape. FIG. 6 depicts an embodiment of the present invention wherein housing 62 is provided as a cylindrical tube structure. However, it should be understood that any type of housing structure may be used including rectangular housing structures. Furthermore, housing 62 includes perforations 63 distributed thereon. Perforations 64 are through holes located on housing 62 that provided access to the interior portion therein. It should be understood that perforations 63 should have a suitable diameter such that termites should be able to fit there through and gain access to the interior portion. A cap 64 may also be provided at a top end of the housing which may have various electrical components thereon used to enable trap assembly 60. It should be understood that cap 64 may be provided having any shape or size.

Figure 8:
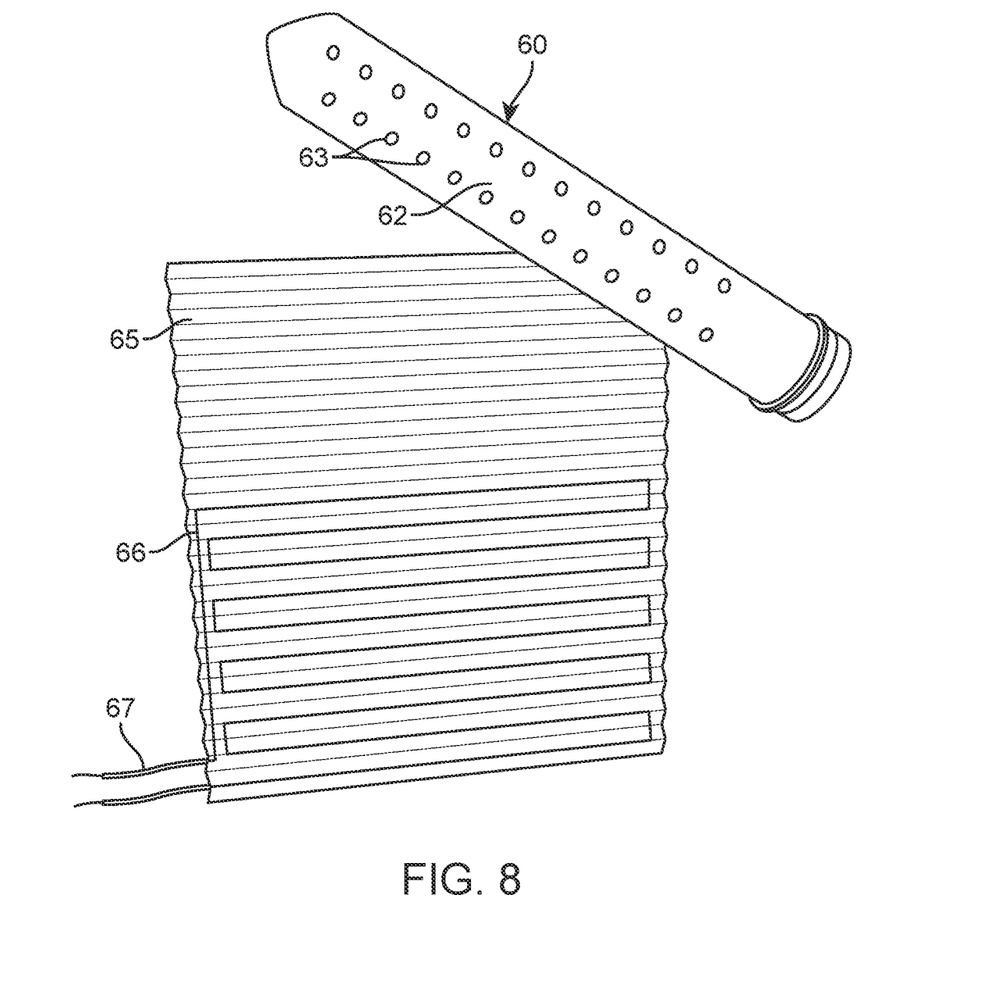
FIG. 8 shows an isometric view of cardboard sheet 65 in a flat configuration depicting conductive ink 66 in accordance with an embodiment of the present invention.

Termite trap assembly 60 further includes a cardboard sheet 65 which may be observed in a laid-out configuration in FIG. 8 of the provided drawings. In the present embodiment, cardboard sheet 65 is provided as a cardboard sheet inserted within the housing having a high cellulose content suitable enough to provide nourishment and attraction to termites. Furthermore, cardboard sheet 65 further includes conductive ink 66 that is etched onto the surface of the cardboard. It should be understood that conductive ink 66 provides suitable conductibility and is etched into cardboard sheet 65 to form a closed circuit. As observed in FIG. 8, conductive ink is etched in a rectangular pattern along the surface of the cardboard and then forms a closed circuit having a sensor 67 in communication thereon. In the present embodiment, sensor 67 is a sensor that can detect the presence of electrical current such as a multimeter. When the closed circuit is formed, sensor 67 should detect and display a voltage or current reading.

As previously stated, cardboard sheet 65 has a high cellulose contact and therefore attracts the presence of termites. When termites begin to eat away at the cardboard sheet, they then compromise the integrity of the sheet and in turn will comprise the integrity of the closed circuit on the cardboard sheet 65. As a result, when enough damage has been done to the cardboard sheet 65 the closed circuit of conductive ink 66 will eventually turn into an open circuit. Therefore, sensor 67 will no longer obtain readings of voltage or current. This can be concluded as the presence of termites in the area which the trap was placed.

Figure 9:
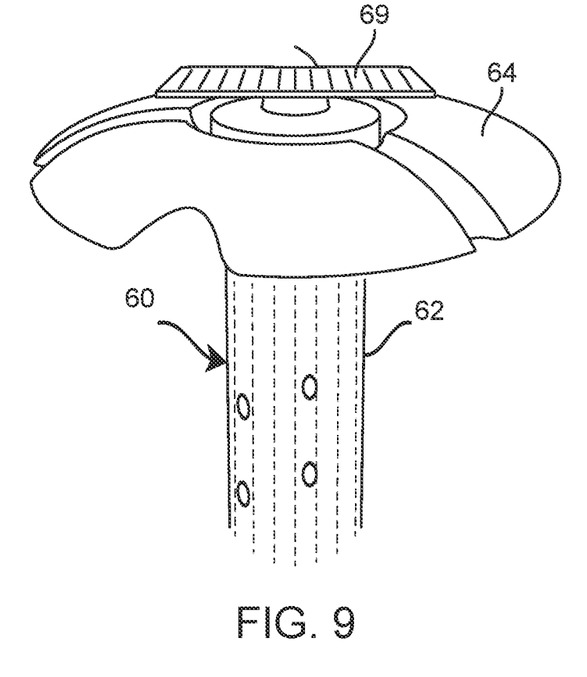
FIG. 9 illustrates an operational isometric view of termite trap assembly 60 having cap 64 with solar panel 69 mounted on a top end in accordance with an embodiment of the present invention.

Termite assembly trap assembly 60 further includes a communication module 68. The communication module 68 may be operatively mounted on the cap 64 of the housing 62 or any other suitable location thereon. In the present embodiment, communication module 68 allows the device to communicate with network assembly 40 and transfer/receive information. This module also allows information to be repeated from any other device in the same family, this includes object detector assembly 20 and pest trap assembly 80. In a preferred embodiment of the present invention, communication module 68 utilizes a low power wide area network. In one embodiment, the low power wide area network may be a LORAWAN™ transmission module. This allows termite trap assembly 60 to communicate with network assembly 40 through a gate way protocol which may be a LORAWAN™ in one embodiment. LORAWAN™ provides the optimal communication protocol to transfer data for the present invention. The device may also be configured to work as a LORAWAN™ repeater to be able to interconnect with other devices to form a network within themselves. This will aid in transmitting information in the event that a gateway is out of reach from a device. Additionally, communication module 68 may utilize only transceiver slave nodes with a server to avoid information theft. Communication module 68 may further be configured to transmit and receive information over a WIFI connection or a Bluetooth connection. This aids a user in pairing a mobile device with termite trap assembly 60. Termite detector assembly 60 may further be configured to communicate with third party systems such as ALEXA™ and/or Google™ Additionally, the communication module 68 allows for the system to be updated remotely from the server to be able to communicate with other third-party communication platforms. In the present embodiment, communication module 68 will transmit an alert to the network in the event that an open circuit is detected on cardboard sheet 65. As a result, a user will be aware of the presence of termites.

Termite trap assembly 60 further includes a solar panel 69 mounted to cap 64 thereon. Solar panel 69 is configured to provide charge to an internal battery that powers communication module 68 and sensor 67. The present embodiment also uses a microcontroller that uses minimal power in order to optimally control the usage of the battery via a standby mode.

Figure 10:
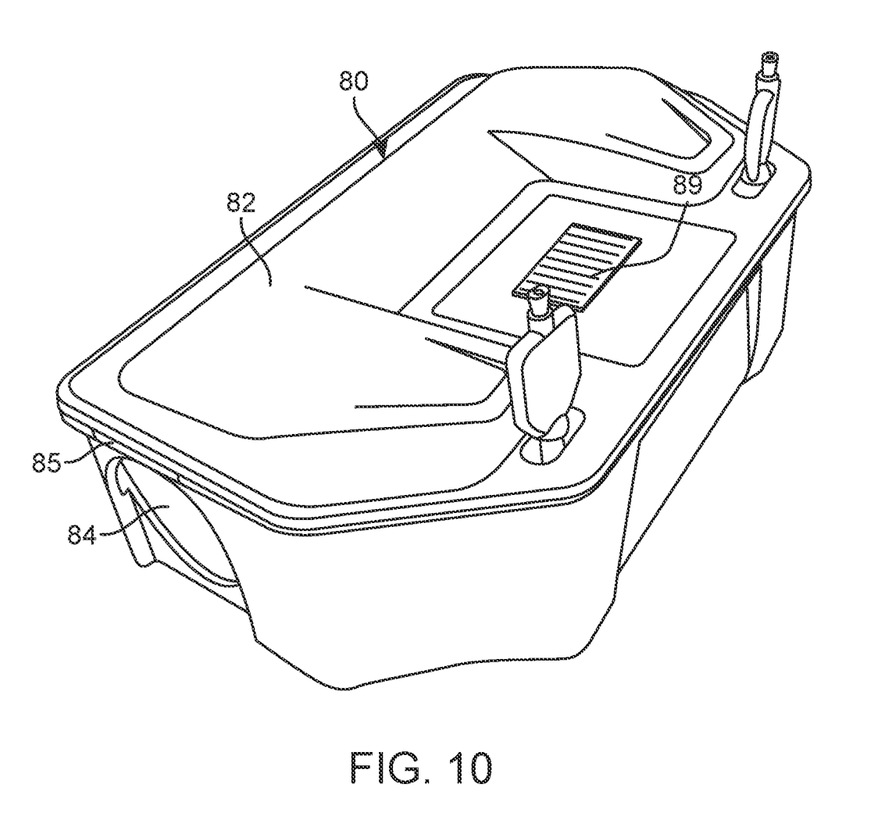
FIG. 10 is a representation of an isometric view of pest trap assembly 80 in a closed configuration in accordance with an embodiment of the present invention.
Figure 11:
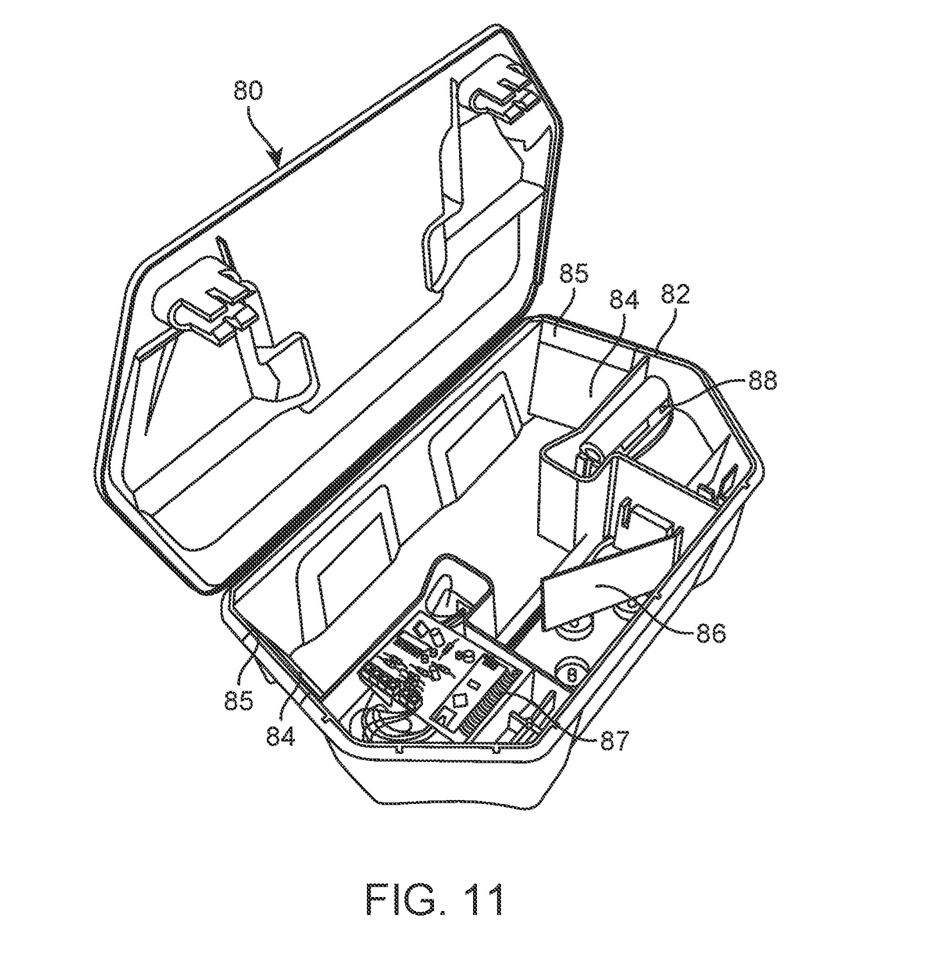
FIG. 11 shows an isometric view of pest trap assembly 80 in an open configuration in accordance with an embodiment of the present invention.

Pest trap assembly 80 includes a housing 82 which can be observed in FIGS. 10 and 11 of the present invention. In one embodiment, housing 82 may be provided as a rectangular box shape that is suitable to hold pests such as rats, mice, lizards, and other variations of pests. It should be understood that the shape and size of housing 82 is not limited to the housing depicted in the drawings. Additionally, housing 82 also includes at least one trap door 84. Trap door 84 is provided as a one-way door structure located on the exterior of the housing. In the present embodiment, a pest may utilize the trap door 84 to gain access within the interior of housing 82. Once within the housing 82, the pest will be unable to exit the interior of the housing since trap door 84 only opens from the exterior of housing 82.

In the present embodiment, trap door 84 further includes a door sensor 85 mounted onto trap door 84. Door sensor 85 may be provided as a motion sensor which will detect any movement from trap door 84. It is desirable that door sensor 85, when triggered will indicate that a pest has entered housing 82. Additionally, the interior of the housing also includes a feeder sensor 86 located therein. Feeder sensor 86 may be provided as a weight sensor and/or light beam sensor on a feeder area of the housing 82. In the present embodiment, feeder sensor 86 may indicate to a user when pest trap assembly 80 is low on feeder.

The sensors are operatively connected to a communication module 87 located within the interior of housing 82. In the present embodiment, communication module 87 allows the device to communicate with network assembly 40 and transfer/receive information. This module also allows information to be repeated from any other device in the same family, this includes object detector assembly 20 and termite trap assembly 60. In a preferred embodiment of the present invention, communication module 87 utilizes a low power wide area network. In one embodiment, the low power wide area network may be a LORAWAN™ transmission module. This allows pest trap assembly 80 to communicate with network assembly 40 through a gate way protocol which may be a LORAWAN™ in one embodiment. LORAWAN™ provides the optimal communication protocol to transfer data for the present invention. The device may also be configured to work as a LORAWAN™ repeater to be able to interconnect with other devices to form a network within themselves. This will aid in transmitting information in the event that a gateway is out of reach from a device. Additionally, communication module 87 may utilize only transceiver slave nodes with a server to avoid information theft. Communication module 87 may further be configured to transmit and receive information over a WIFI connection or a Bluetooth connection. This aids a user in pairing a mobile device with pest trap assembly 80. pest trap assembly 80 may further be configured to communicate with third party systems such as ALEXA™ and/or Google™ Additionally, the communication module 87 allows for the system to be updated remotely from the server to be able to communicate with other third-party communication platforms. In the present embodiment, an alert is transmitted to the network in the event that the trap door sensor 85 and feeder sensor 86 is triggered.

Pest trap assembly 80 further includes a solar panel mounted to a top end. The solar panel is configured to provide charge to an internal battery 88 that powers communication module 87 and the sensors. The present embodiment also implements a microcontroller that uses minimal power in order to optimally control the usage of the battery via a standby mode. A solar panel 89 is further coupled to the battery to efficiently provide charge to the battery 88 therein.

Figure 5:
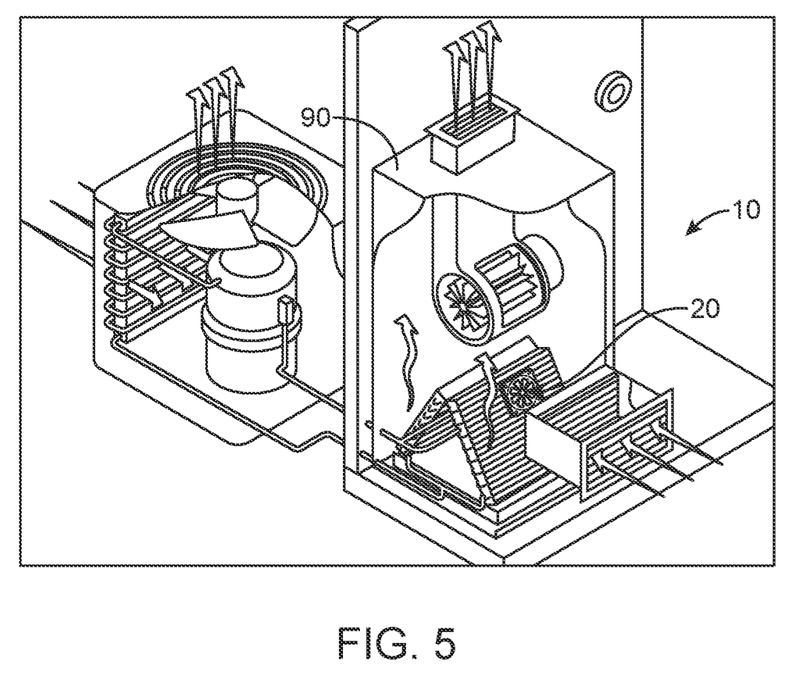
FIG. 5 shows an isometric view of where device assembly 20 should be placed in an air conditioning system for another implementation of sensor system 10 in accordance to another embodiment of the present invention.

In yet another implementation of sensor system 10, device assembly may be configured to alert a user when to change an air conditioning filter in an air conditioning system 90. This implementation may also alert the user when to clean the evaporator of the air conditioning system 90. This implementation may be observed in FIG. 5 of the provided drawings. In this implementation, a small fan is placed between the evaporator and the air filter of the air conditioning system. This small fan will have a rotation speed that varies depending of the amount of air flow that is being circulated through it. A sensor and receiver will count the interruption frequency of each blade of the fan. The higher the air flow, the higher the frequency of interruptions. The lower the air flow, the lower the frequency of interruptions. Device assembly 90 is configured to alert a user once air flow is at a low frequency. This will indicate to a user that the air filter for air conditioning system 90 needs to be changed. It is also configured to alert the user once the air flow is at a high frequency. This will indicate that the air conditioning system 90 is working without an air filter. The user can then configure to equipment to stop in order to protect air conditioning system 90.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A sensor system for trapping termites, consisting of:
a) a termite trap assembly including a housing having a plurality of perforations, wherein the perforations are a series of circular openings longitudinally disposed in parallel columns about a length of said housing, said termite trap assembly further includes a cardboard sheet containing a cellulose content adapted to attract termites, the cardboard sheet being a rectangular sheet with a series of opposing repeating folds to facilitate rolling the cardboard sheet along said folds for storage within the housing, the cardboard sheet being stored entirely within said housing, said cardboard sheet further includes conductive ink etched onto a surface of the cardboard sheet to form a closed circuit, said conductive ink is printed directly on the cardboard sheet, said closed circuit is configured to produce a signal when a part of the conductive ink is broken and the closed circuit is opened, said termite trap further including an electrical sensor connected to said closed circuit, the electrical sensor being a multimeter for the detection of breaking of the closed circuit, the housing further including a cap mounted thereon, wherein the cap extends outwardly with respect to the housing, wherein said cap receives a solar panel, said solar panel is configured to convert solar energy to electrical energy used to charge the sensor system for trapping termites, wherein said cardboard sheet having the con- ductive ink is interchangeable, said housing is cylindrical in shape, said cardboard sheet being rolled and stored within said housing; and b) a network assembly including a communication module operatively engaged with said termite trap assembly, wherein said communication module is in wireless communication with a server over a lower power wide area network, the communication module is in abutting contact and directly connected to the housing, wherein said communication module transmits an alert to said server in the event that said closed circuit is interrupted thereby indicating an open circuit as a result of deterioration of said cardboard sheet, said alert is further transmitted to a mobile device or a computer, said communication module is removably attached to the housing.

\* \* \* \* \*